G. S. MANNING.
Carriage-Spring.
No. 55,319.
Patented June 5, 1866.
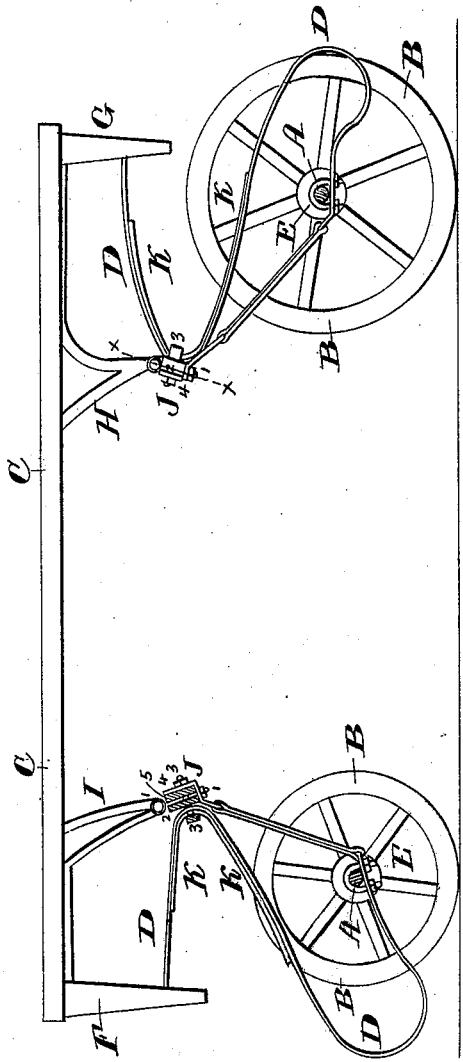
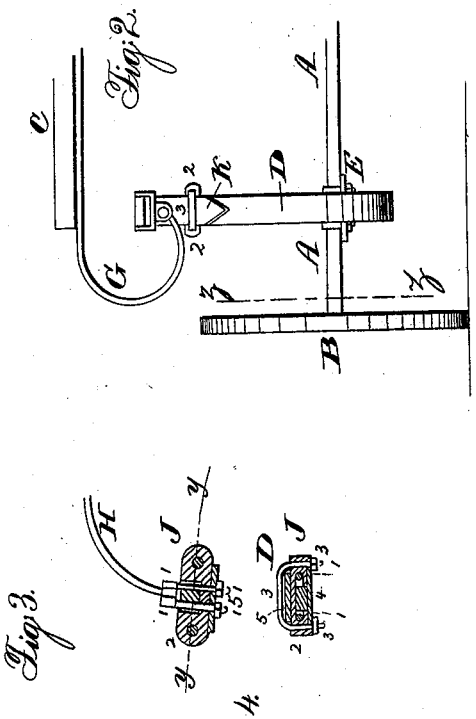
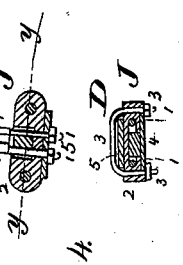
Witnesses
Inventor
G. S. Manning
Per Munn & Co
Attorneys

UNITED STATES PATENT OFFICE.

G. S. MANNING, OF SPRINGFIELD, ILLINOIS.

IMPROVEMENT IN CARRIAGE-SPRINGS.

Specification forming part of Letters Patent No. 55,319, dated June 5, 1866.

*To all whom it may concern:*

Be it known that I, G. S. MANNING, of Springfield, in the county of Sangamon and State of Illinois, have invented a new and useful Improvement in Carriage-Springs; and I do hereby declare that the following is a full, clear, and exact description thereof, which will enable others skilled in the art to make and use the same, reference being had to the accompanying drawings, forming part of this specification, in which—

Figure 1 is a side view of my improved carriage-spring, showing the manner in which they are attached to a wagon, partly in section, through the line $z\,z$, Fig. 2. Fig 2 is a detail view, showing the manner in which the end of the spring is connected to the curved arm which connects it to the carriage-body. Fig. 3 is a detail sectional view taken through the line $x\,x$, Fig. 1. Fig. 4 is a detail sectional view taken through the line $y\,y$, Fig. 3.

Similar letters of reference indicate like parts.

My invention has for its object to improve the form and construction of the carriage-springs for which a patent was granted to me July 21, 1863; and it consists, first, of the S-shaped spring, either with or without strengthening leaf or leaves, connected to the axle and to the supporting-arms of the carriage-body in the manner hereinafter set forth; and, second, in the construction of the connection between the body or upper bend of the spring and the supporting-arm and its combination with said spring and arm.

A is the axle, and B are the wheels, of the carriage. C is the bottom or lower part of the carriage-body. D is the spring, which is made somewhat in the form of the letter S, as shown in Fig. 1. The lower end of the spring D is firmly attached to the axle A by a clip, E. The upper end of the spring is attached to the end of the curved arms F and G. The rear one, G, of these arms is attached to the body of the carriage, and the front one, F, is attached to the fifth or center wheel. The connection by which the ends of the springs D are connected to the curved arms F G is the ordinary connection by which the end of the arms is hung from the end of the spring, as shown in Fig. 2. For some styles of carriages the curved arms F and G may be replaced by springs, so as to give more spring to the carriage, if desired.

H and I are arms, the rear one, H, of which is attached to the bottom or frame of the carriage-body, and the front one, I, is attached to the fifth or central wheel. The ends of these arms H and I are connected to the springs D at their first or upper bend, as shown in Fig. 1, by an anti-rattling connection, J, which is constructed as follows: To the ends of each of the arms H and I are pivoted two bolts, 1, which pass through the block 2, and are secured in place by nuts screwed upon their ends, as shown in Figs. 1 and 3. The springs D and leaves K are held together and secured to the connection J by a clasp, 3, the arms of which are bolts passing through the block 2 and the plate 4, and held in place by nuts, as shown in Figs. 1, 3, and 4. The block 2, between the bolts 1 and the plate 4, is chambered out, and the space thus formed is filled with a rubber spring, 5, as seen in Figs. 1, 3, and 4. This rubber by its elasticity compensates for the wear of the different parts of the connection J and prevents all rattling between them.

The springs D may be strengthened by one or more leaves, K, according as the character of the carriage to which the springs may be attached may render necessary.

L are safety-straps connecting the clip E and the connection J to guard against injury from the rebound of the springs, and also to relieve the draft-strain upon the springs.

It should be observed that the block 2, where it comes in contact with the spring D, at the connection J, should have formed upon it a slight projection, which enters a hole formed in the said spring D and prevents the spring from slipping.

What I claim as new, and desire to secure by Letters Patent, is—

1. The S-shaped springs D, either with or without the strengthening leaf or leaves K, constructed and connected to the axle and to the supporting-arms of the carriage-body, substantially as described, and for the purpose set forth.

2. The connection J, constructed as described, in combination with the spring D and with the supporting-arms H I, substantially as and for the purpose set forth.

The above specification of my invention signed by me this 21st day of March, 1866.

G. S. MANNING.

Witnesses:
ALEX. F. ROBERTS,
JAMES T. GRAHAM.